March 10, 1931.   E. W. N. BOOSEY   1,796,077

NONCORRODIBLE CLEAN-OUT FITTING

Filed July 11, 1927

INVENTOR.
Edward W. N. Boosey.
BY
ATTORNEY.

Patented Mar. 10, 1931

1,796,077

UNITED STATES PATENT OFFICE

EDWARD W. N. BOOSEY, OF DETROIT, MICHIGAN

NONCORRODIBLE CLEAN-OUT FITTING

Application filed July 11, 1927. Serial No. 204,724.

This invention relates to non-corrosive cleanout fittings, its object being to provide a cleanout fitting or the like in which both the plug and the element to be sealed are formed of iron and so arranged that the plug is threaded in a lead seat to secure a tight fit.

In plumbing fixtures and the like a brass plug is usually threaded in an iron fitting to reduce the liability of the plug rusting fast but brass plugs are much more expensive than iron and are only partially effective as it is quite often a difficult matter to unscrew brass plugs after they have been in place for any length of time. By the construction as hereinafter described it is possible to use an iron plug without liability of the plug rusting in place.

The principal feature of the invention is in the provision of the fitting to receive the plug having an annular space for lead caulking forced thereinto subsequent to the positioning of the plug and thereafter remaining in place permitting threading of the plug in or out of position.

A further feature of the invention is in the provision in a plumbing fitting of a support for a sealing plug of such character and form as to permit ready removal whereby the fitting may be used with or without a plug.

These various objects and the several novel features of the invention are hereinafter more fully described and claimed and the preferred form of a non-corrosive cleanout fitting embodying my invention is shown in the accompanying drawings in which—

Figure 1:
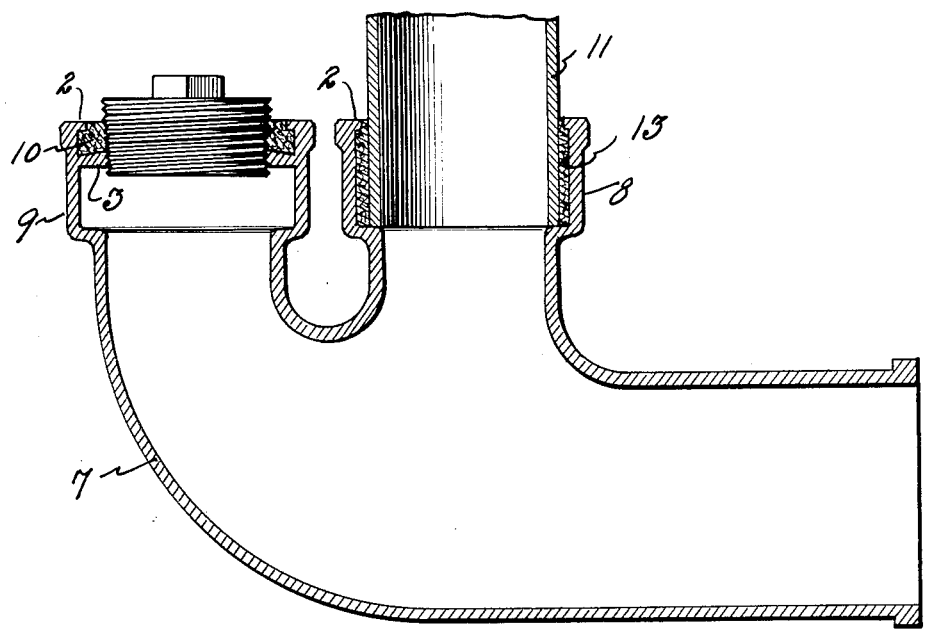
Fig. 1 is a cross section of a plumbing fixture showing my improved construction.

It is to be understood that this non-corrosive fitting is utilizable in various ways where a plug is required to be used in sealing an aperture and in which the non-corrodible characteristic is desirable. In the drawing I have shown a plumbing structure known as a "stack base". This is to be understood as illustrative of only one form of structure in which my invention may be embodied or associated and the description of this type of structure will enable others to utilize the same with any element especially plumbing fittings with which it may be advantageously used.

Figure 2:
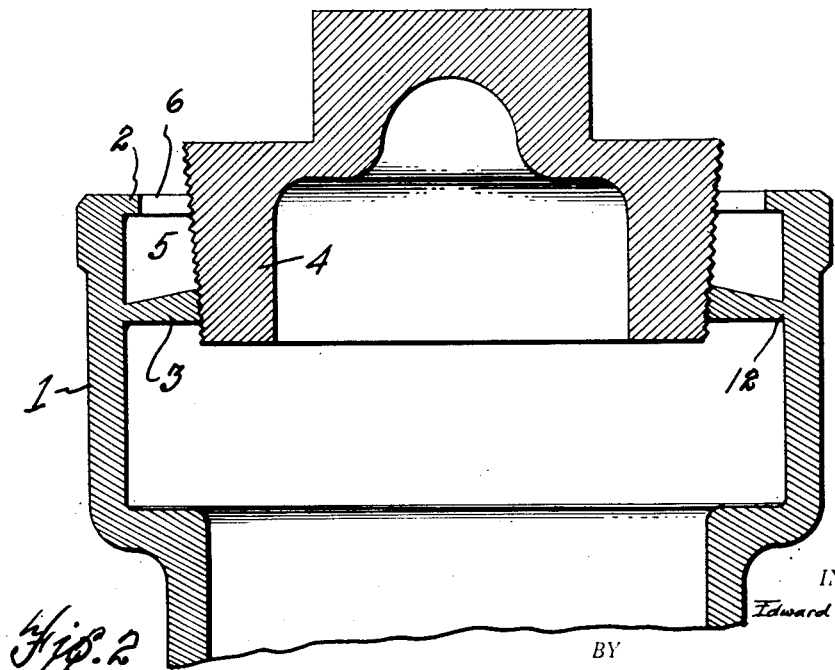
Fig. 2 is an enlarged vertical section of a portion of an iron fitting showing the plug in place.

In Fig. 2 I have shown an enlarged section of a plumbing fitting 1 which is of cast iron and has the general form of a hub. At its open end there is provided an integral internal flange 2 of small depth and below the said flange and in spaced relation therewith I provide a second internal flange 3 providing a central threaded aperture to receive an iron plug 4. The threads of this flange 3 have a loose fit in the threads of the plug for the reason that both parts being of iron rust may accumulate in the said threads. By making the threads between the plug and the flange 3 a loose fit and by forming the flange with only one or two threads the possibility of the plug rusting in place is reduced to a minimum. The plug being positioned in the flange 3 as suggested in Fig. 2, there is an annular chamber 5 provided about the body of the plug and between the flanges 2 and 3. The flange 2 has an aperture materially larger than the diameter of the plug providing a throat 6 to the chamber 5 and permitting introduction of lead caulking which, subsequent to the positioning of the plug as shown, is forced to place. By caulking this lead in place about the threaded body of the plug the lead is made to conform to the threads and thus there is provided a threaded aperture in the lead caulking as will be more clearly understood. This plug is also preferably of tapered form so that if there is a slight leakage at any time the plug may be screwed in to greater depth and due to its tapered form will tend to seal the opening, and further the lead caulking may be more tightly hammered about the plug at any time to insure the sealing of the interior of the member to which the plug is applied.

In Fig. 1 I have shown a stack base 7. With this type of structure there are two hubs provided integral with the fitting as indicated at 8 and 9, the hub 9 corresponding in all general respects to the form of the structure shown in Fig. 2. Also (not here shown) it is to be understood that prior to erection in a building both these hubs are provided with the flange 3. In erecting the stack base it is sometimes necessary that the stack indicated at 11 be used with a hub 8 or with the hub 9 depending upon the location of the stack in relation to the wall of the building. In the event it is to be used with the hub 8, as in the case illustrated, the flange 3 is broken from position in that hub. For this purpose the flange 3 at its point of connection with the wall of the hub is comparatively thin enabling it to be readily removed by a hammer or like instrument whereupon the stack 11 may be introduced into the hub 8 as shown in Fig. 1 providing a space between the inner edge of the flange 2 and the stack in which caulking 13 may be introduced as is usual. In the illustration the other hub 9 is provided with a plug as shown and the lead packing 10 introduced thereinto as above described. In case it is necessary to use the stack 11 with the hub 9 it will be readily understood that in such instances the flange 3 of the hub 9 would be removed and that in the hub 8 remain in place to receive the plug.

From the foregoing description it will become evident that the metal flange 3 integral with the body of the hub or fitting with which the plug is to be used is only provided for the purpose of supporting the plug during the caulking operation and to provide a base or support for the caulking and, due to the looseness of the threads in the member 3 and the plug, the threads depended upon to seal the aperture are in the lead member. Therefore, the plug 4 will not become rusted in place and is always readily removable and maintains a tight joint and, if by continued removal or insertion of the plug the threads of the lead member become deformed to an extent permitting leakage, the lead by the use of a caulking implement can be hammered to tight engagement with the plug restoring the parts to original condition.

It is believed evident from the foregoing description that my construction is less expensive than former constructions utilizing brass plugs, is equally efficient and is practically indestructible even though comparatively soft material is used as the threaded member to receive the plug.

Having thus briefly described my invention, what I claim and desire to secure by Letters Patent of the United States is—

1. In a device of the character described, an iron plumbing fitting having a hub, an internal flange at the open end of the hub providing a central aperture, a second integral flange within the hub spaced from the first flange and having a central threaded aperture less in diameter than the aperture provided by the first flange, a threaded iron plug of tapered form loosely supported in the threaded aperture of the second flange, a lead member provided in the chamber between the flanges about the plug in engagement with the threads of the plug and providing a seat therefor, the said second flange having a weakened portion permitting its ready severance from the body of the hub substantially as and for the purpose described.

2. In a device of the character described, an iron plumbing fitting having an open ended hub for introduction of an element thereinto, an integral flange below the open end of the hub having a central threaded aperture less in diameter than the said open end of the hub, a threaded iron plug loosely supported in the threaded aperture of the flange, a ring of comparatively soft non-corrodible material positioned in the space within the hub about the plug and in tight engagement with the threads thereof providing a seat therefor, the flange having a weakened portion adjacent its point of connection with the hub permitting its ready severance therefrom.

3. In a device of the character described, an iron plumbing fitting having a hub, an internal flange at the open end of the hub providing a central aperture, a second internal flange spaced from the first flange and having a central threaded aperture less in diameter than the aperture provided by the first flange and the two flanges providing an annular recess or chamber therebetween, a threaded iron member of tapered form for threaded relation with the threaded aperture of the second flange, a comparatively soft non-corrodible material positioned in the annular recess and in tight engagement with the threads of the tapered member, the threaded flange being severable from the hub and providing means by which the non-corrodible material is caused to be packed tightly in the recess and against the second flange by the act of the threading of the tapered member into the threaded aperture of the second flange.

In testimony whereof I sign this specification.

EDWARD W. N. BOOSEY.